United States Patent
Toyoda (10) Patent No.: US 9,641,753 B2
(45) Date of Patent: May 2, 2017

(54) IMAGE CORRECTION APPARATUS AND IMAGING APPARATUS

(71) Applicant: FUJITSU LIMITED, Kawasaki-shi, Kanagawa (JP)

(72) Inventor: Yuushi Toyoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/211,097

(22) Filed: Jul. 15, 2016

(65) Prior Publication Data

US 2016/0330371 A1 Nov. 10, 2016

Related U.S. Application Data

(62) Division of application No. 14/280,148, filed on May 16, 2014, now Pat. No. 9,426,360.

(30) Foreign Application Priority Data

Jun. 24, 2013 (JP) .................................. 2013-131828

(51) Int. Cl.
*H04N 5/217* (2011.01)
*H04N 5/235* (2006.01)
(Continued)

(52) U.S. Cl.
CPC ......... *H04N 5/23229* (2013.01); *G06T 5/002* (2013.01); *G06T 5/50* (2013.01);
(Continued)

(58) Field of Classification Search
CPC . G06T 2207/10016; G06T 2207/20182; G06T 5/002; G06T 5/50; G06T 7/215; H04N 9/646
(Continued)

(56) References Cited

U.S. PATENT DOCUMENTS

| 5,568,196 A | 10/1996 | Hamada et al. |
| 6,061,100 A | 5/2000 | Ward et al. |

(Continued)

FOREIGN PATENT DOCUMENTS

| JP | 7-288719 | 10/1995 |
| JP | 2000-209507 | 7/2000 |

(Continued)

OTHER PUBLICATIONS

USPTO, (DIEP) Non-Final Rejection, Nov. 3, 2015, in parent U.S. Appl. No. 14/280,148 [allowed].

(Continued)

*Primary Examiner* — Trung Diep
(74) *Attorney, Agent, or Firm* — Fujitsu Patent Center (57) ABSTRACT

An image correction apparatus includes a difference computing unit which computes an absolute difference value between corresponding pixels in a first and a second image, a combining ratio computing unit which computes a combining ratio of the second image to the first image so that the combining ratio decreases as the absolute difference value of each pixel contained in a filter region defined around an attention pixel on the first image increases, and a combining unit which produces a corrected image by combining the value of the attention pixel in the first image with the value of the corresponding pixel in the second image in accordance with the combining ratio computed for the attention pixel and by taking the combined value as the value of the corresponding pixel in the corrected image.

4 Claims, 6 Drawing Sheets

(51) Int. Cl.
*H04N 5/232* (2006.01)
*G06T 5/50* (2006.01)
*G06T 5/00* (2006.01)

(52) U.S. Cl.
CPC ............... *G06T 2207/10016* (2013.01); *G06T 2207/20004* (2013.01); *G06T 2207/20012* (2013.01); *G06T 2207/20182* (2013.01); *G06T 2207/20216* (2013.01)

(58) Field of Classification Search
USPC ...................... 348/208.1–208.4, 208.99, 241
See application file for complete search history.

(56) References Cited

U.S. PATENT DOCUMENTS

| | | | |
|---|---|---|---|
| 8,773,593 B2 * | 7/2014 | Persson | H04N 5/21 348/222.1 |
| 2007/0139560 A1 | 6/2007 | Zhong | |
| 2007/0229698 A1 * | 10/2007 | Kakinuma | H04N 5/144 348/362 |
| 2008/0291298 A1 * | 11/2008 | Kim | G06T 5/50 348/241 |
| 2009/0232416 A1 * | 9/2009 | Murashita | G06T 7/20 382/294 |
| 2011/0002539 A1 | 1/2011 | Fukutomi | |
| 2012/0257113 A1 | 10/2012 | Hsu et al. | |
| 2013/0016253 A1 | 1/2013 | Kobayashi | |
| 2013/0093923 A1 | 4/2013 | Imagawa | |
| 2013/0250146 A1 | 9/2013 | Suzuki | |
| 2013/0314557 A1 | 11/2013 | Furukawa | |

FOREIGN PATENT DOCUMENTS

| | | |
|---|---|---|
| JP | 2010-141663 | 6/2010 |
| JP | 2012-170006 | 9/2012 |
| WO | 2008/032392 A1 | 3/2008 |

OTHER PUBLICATIONS

USPTO, (DIEP) Restriction Requirement, Aug. 4, 2015, in parent U.S. Appl. No. 14/280,148 [allowed].

EESR—Extended European Search Report of European Patent Application No. 14170127.6, dated Mar. 5, 2015.

USPTO, (DIEP) Notice of Allowance and Notice of Allowability, Apr. 26, 2016, in parent U.S. Appl. No. 14/280,148 [allowed].

JPOA—Office Action of Japanese Patent Application No. 2013-131828 dated Feb. 28, 2017, with machine translation of the Office Action.

* cited by examiner

IMAGE CORRECTION APPARATUS AND IMAGING APPARATUS

CROSS-REFERENCE TO RELATED APPLICATION

This application is a divisional of application Ser. No. 14/280,148, filed May 16, 2014, which is based upon and claims the benefit of priority of the prior Japanese Patent Application No. 2013-131828, filed on Jun. 24, 2013, the entire contents of which are incorporated herein by reference.

FIELD

The embodiments described herein are related to an image correction apparatus and imaging apparatus which reduces noise components contained in the values of pixels in a target image by using an image generated before or after the target image.

BACKGROUND

Research has been under way for many years on technology that reduces, using a plurality of temporally successive images such as moving images or a plurality still images taken in rapid succession, noise components contained in the values of pixels in any one of the plurality of images. Such technology is referred to as three-dimensional noise reduction (3DNR).

In one example of an image correction apparatus using 3DNR, any fluctuating component contained in each pixel value of the image along the time axis is the noise component to be removed. Therefore, the image correction apparatus reduces the noise component by taking a time average of the values of the pixels located at the same position in a plurality of temporally successive images. To achieve this, the image correction apparatus, for example, calculates the difference between the value of each pixel in the current image and the value of the corresponding pixel in the past image, multiplies the difference value by a feedback coefficient, and adds the product to the value of that pixel in the current image. However, the position of a motion region containing a moving object differs from one image to the next. As a result, if the pixel values taken from the same position in the plurality of images are averaged over time, since the values of the pixels contained in the moving object and the values of the pixels not contained in the moving object are averaged together in areas along their boundaries, an afterimage of the moving object occurs along the boundaries, resulting in a blurred image.

In view of the above, a technique that reduces the effects of the afterimage by reducing the feedback coefficient k if the difference value between the current video signal and the video signal one frame back is large, and that reduces noise by increasing the feedback coefficient k if the difference value is small is proposed (for example, refer to Japanese Laid-open Patent Publication No. 2000-209507). Further, a technique that obtains the filter coefficient k of a low-pass filter to be applied between the current frame and the motion-compensated previous frame, from both the absolute value of the interframe difference and the absolute value of the neighboring pixel difference within the frame is proposed (for example, refer to Japanese Laid-open Patent Publication No. H07-288719).

SUMMARY

However, even if the above techniques are applied, an afterimage of the moving object may occur on the corrected image in areas near the boundary of the region containing the moving object. For example, if the moving object is moving relatively fast, the contour of the moving object on the image becomes unclear, and the spatial variation of the pixel value becomes small in the areas near the boundary. As a result, the absolute difference value between the corresponding pixels in the two frames also becomes small in the areas near the boundary, and the feedback coefficient does not become sufficiently small, as a result of which the pixel value of the past image is reflected more or less in the pixel value of the corrected image.

According to one embodiment, an image correction apparatus is provided. The image correction apparatus includes a difference computing unit which computes an absolute difference value between corresponding pixels in a first and a second image, a combining ratio computing unit which computes a combining ratio of the second image to the first image so that the combining ratio decreases as the absolute difference value of each pixel contained in a filter region defined around an attention pixel on the first image increases, and a combining unit which produces a corrected image by combining the value of the attention pixel in the first image with the value of the corresponding pixel in the second image in accordance with the combining ratio computed for the attention pixel and by taking the combined value as the value of the corresponding pixel in the corrected image.

The object and advantages of the invention will be realized and attained by means of the elements and combinations particularly explained in the claims.

It is to be understood that both the foregoing general description and the following detailed description are exemplary and explanatory, and are not restrictive of the invention as claimed.

DESCRIPTION OF EMBODIMENTS

An image correction apparatus according to a first embodiment will be described below with reference to the drawings.

Figure 1:
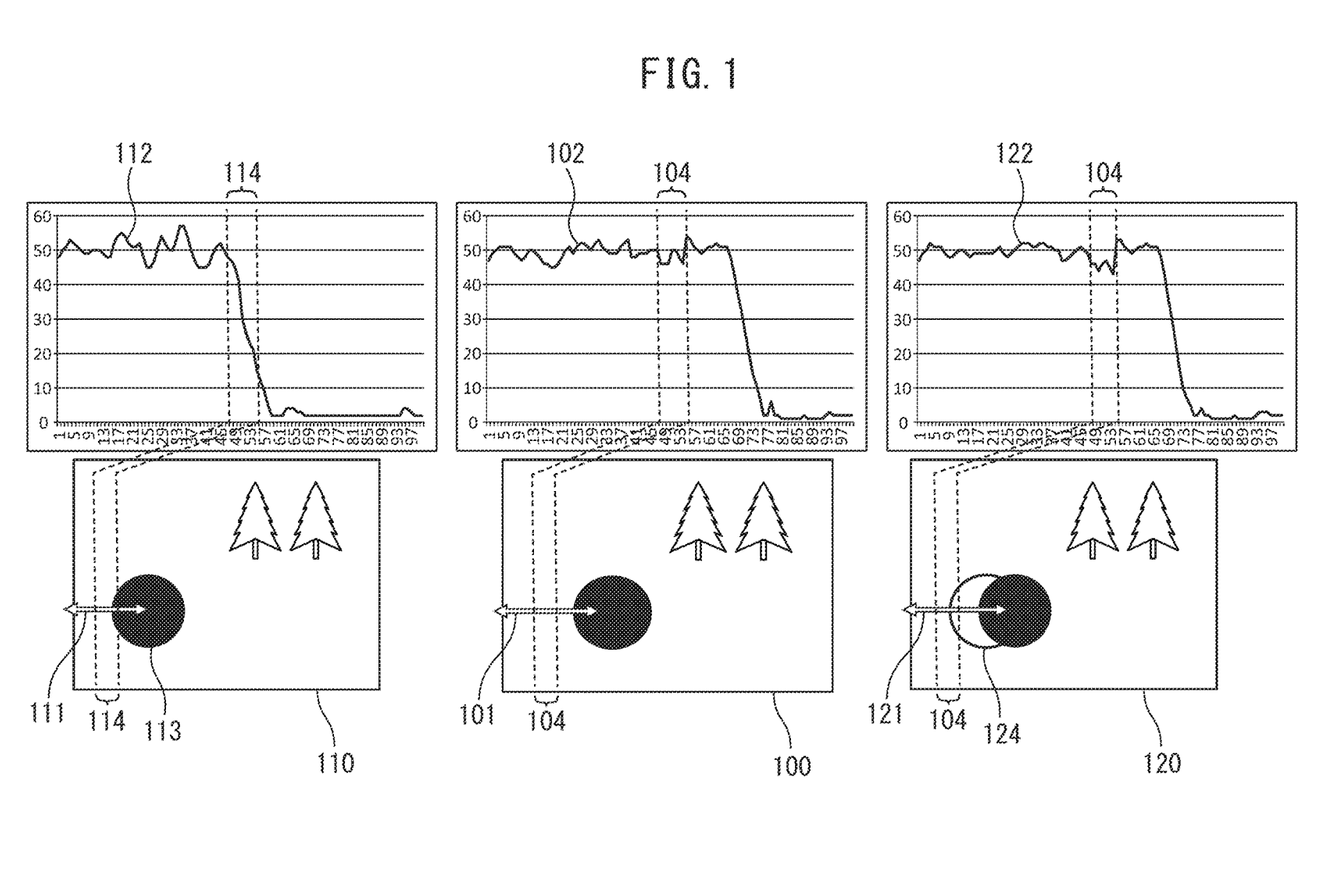
FIG. 1 is a diagram for explaining why an afterimage occurs on a corrected image in the prior art.

First, referring to FIG. 1, a description will be given, by way of example, of how an afterimage can occur on a corrected image in the prior art. A current image 100, a reference image 110 which is generated one frame before the current image 100, and a corrected image 120 which is obtained by correcting the current image 100 using the reference image 110 are presented in FIG. 1. A profile 102 of pixel values taken along a horizontal line 101 is depicted above the current image 100. Similarly, a profile 112 of pixel values taken along a horizontal line 111 located at the same height as the line 101 is depicted above the reference image 110. Further, a profile 122 of pixel values taken along a horizontal line 121 located at the same height as the line 101 is depicted above the corrected image 120. In each of the profiles 102, 112, and 122, the abscissa represents the pixel position along the horizontal direction, and the ordinate represents the pixel value. In a region 114 near the contour of a moving object 113 contained in the reference image 110, the pixel value changes gently, as depicted by the profile 112. As a result, the difference between any pixel value in the region 114 on the reference image and the corresponding pixel value in a region 104 defined at the same position on the current image 100 may become as small as the pixel value fluctuation due to noise. Accordingly, in the prior art, the pixel values within the region 104 on the current image 100 are blended with the corresponding pixel values within the region 114 defined at the same position on the reference image 110 and become lower than their original values, as depicted by the profile 122. This results in the formation of a moving object afterimage 124 on the corrected image at the position corresponding to the contour of the moving object 113 on the reference image 110.

Therefore, in order to reduce the noise component contained in each pixel value of the current image to be corrected, the image correction apparatus corrects the value of each pixel in the current image (first image) by using one or more than one reference image (second image) generated before the current image. For this purpose, the image correction apparatus counts, within a filter region defined around an attention pixel arbitrarily set on the current image, the number of pixels for which the absolute difference value between corresponding pixels in the current and reference images is not smaller than a predetermined value. Then, when the count value is not smaller than the predetermined threshold value, the image correction apparatus sets the combining ratio of the reference image to the current image lower than the combining ratio when the count value is smaller than the predetermined threshold value.

In the present embodiment, the target image for processing is an image contained in moving image data. The image may be a frame produced by progressive scanning or may be a field produced by interlaced scanning. Further, the target image for processing is a color digital image represented by an RGB color system, each color having an 8-bit gray scale intensity. In the following description, the pixel value represents the color component of a specific color. Then, for each color component, the process described below is performed.

The number of bits used to represent the gray scale intensity of each color component is not limited to 8 bits, but may be, for example, 4 bits or 10 bits. Further, the target image for processing may be a color digital image represented by some other color system such as YUV or HSV. In that case, the pixel value in the following description represents a component such as hue, saturation, luminance, or the like. Then, for each such component, the process described below is performed. Alternatively, the target image for processing may be a gray image in which each pixel has a luminance value only. Further, the target image for processing may be one of a plurality of still images taken in rapid succession.

Figure 2:
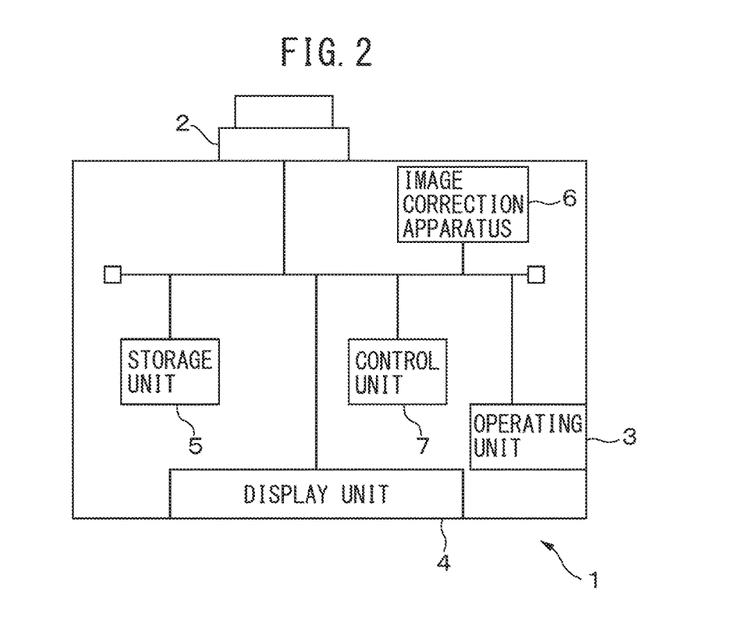
FIG. 2 is a schematic diagram illustrating the configuration of an imaging apparatus in which an image correction apparatus is incorporated.

FIG. 2 is a schematic diagram illustrating the configuration of an imaging apparatus in which the image correction apparatus according to the first embodiment is incorporated. The imaging apparatus 1 is an apparatus capable of generating a plurality of temporally successive images, and is, for example, a video camera, a mobile telephone having a motion video capturing function, or a digital camera having a motion video capturing function or a continuous shooting function. As illustrated in FIG. 2, the imaging apparatus 1 includes, in addition to the image correction apparatus 6, a camera module 2, an operating unit 3, a display unit 4, a storage unit 5, and a control unit 7. The imaging apparatus 1 may further include an interface circuit (not depicted) conforming to a serial bus standard such as Universal Serial Bus, in order to connect the imaging apparatus 1 to another apparatus such as a computer or a television receiver. The control unit 7 is connected to the other component units, for example, via a bus.

The camera module 2 includes an image sensor having an array of solid-state imaging devices arranged in two dimensions, and an imaging optic for focusing an image of a subject onto the image sensor. The camera module 2 generates images of the subject at predetermined intervals of time. The images are color digital images represented by the RGB color system, each color having an 8-bit gray scale intensity, as earlier described. Each time an image is generated, the camera module 2 stores the generated image in the storage unit 5.

The operating unit 3 includes, for example, various kinds of operating buttons or dial switches for the user to operate the imaging apparatus 1. In response to the user operation, the operating unit 3 sends a control signal for starting the shooting, focusing, or other action, or a setting signal for setting the shutter speed, aperture opening, etc. to the control unit 7.

The display unit 4 includes, for example, a display device such as a liquid crystal display device, and displays various kinds of information received from the control unit 7 or images generated by the camera module 2. The operating unit 3 and the display unit 4 may be combined into one unit using, for example, a touch panel display.

The storage unit 5 includes, for example, a readable/writable volatile or nonvolatile semiconductor memory circuit. Each time an image is received from the camera module 2, the storage unit 5 stores the received image. When a read request is received from the image correction apparatus 6, the storage unit 5 sends the requested image to the image correction apparatus 6. When a corrected image produced by reducing the noise component contained in each pixel value is received from the image correction apparatus 6, the storage unit 5 stores the corrected image.

The image correction apparatus 6 corrects each pixel value of the current image, i.e., the target image for processing, by using as the reference image a corrected image that the image correction apparatus 6 produced by correcting the image generated one frame before the current image. The image correction apparatus 6 produces the corrected image of the current image by reducing the noise component contained in each pixel value of the current image. Then, the image correction apparatus 6 outputs the corrected image and stores the corrected image as the reference image for the next image. The details of the image correction apparatus 6 will be described later.

The control unit 7 includes at least one processor and its peripheral circuitry, and controls the entire operation of the imaging apparatus 1. For example, the control unit 7 sets the shutter speed or the aperture opening, based on the setting signal received from the operating unit 3 and the amount of time the subject is to be exposed to light. Further, the control unit 7 may apply such processing as color balance adjustment, edge enhancement, or contrast enhancement to the image corrected by the image correction apparatus 6.

Figure 3:
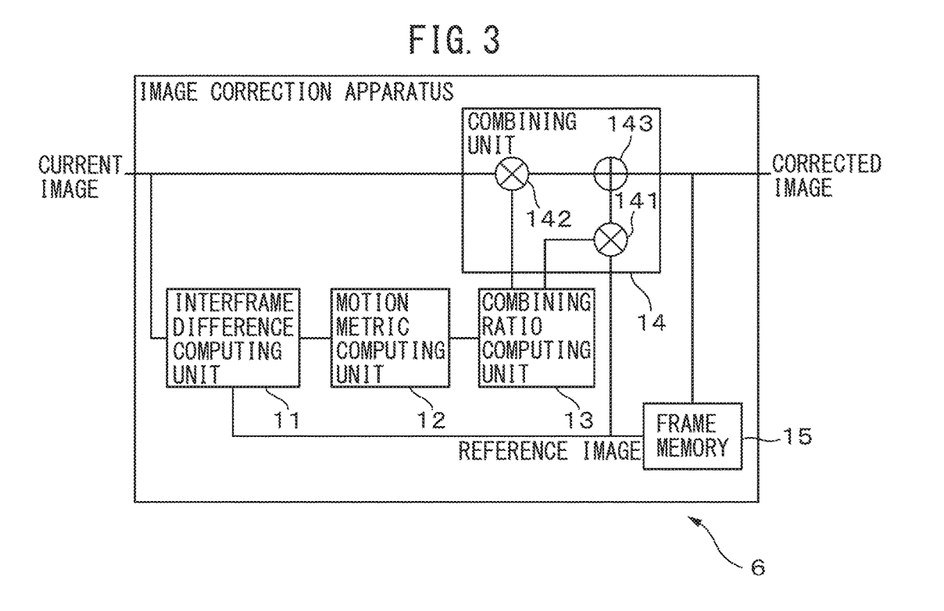
FIG. 3 is a diagram illustrating the configuration of the image correction apparatus.

The various component elements of the image correction apparatus 6 will be described below. FIG. 3 is a diagram illustrating the configuration of the image correction apparatus 6 according to the first embodiment. The image correction apparatus 6 includes an interframe difference computing unit 11, a motion metric computing unit 12, a combining ratio computing unit 13, a combining unit 14, and a frame memory 15. These units constituting the correction apparatus 6 are implemented in the form of a single integrated circuit on which the circuits corresponding to the respective units are integrated. Alternatively, these units constituting the correction apparatus 6 may each be implemented as a separate circuit.

The interframe difference computing unit 11 computes the absolute difference value between corresponding pixels in the current and reference images on a pixel-by-pixel basis. The interframe difference computing unit 11 may compute the absolute difference value between corresponding pixels indirectly by calculating the square of the difference value between the corresponding pixels in the current and reference images. The interframe difference computing unit 11 outputs the pixel-by-pixel absolute difference value to the motion metric computing unit 12.

The motion metric computing unit 12 sequentially sets each pixel in the current image as an attention pixel, and sets a designated filter region around the attention pixel. Then, for each attention pixel, the motion metric computing unit 12 counts, within the filter region, the number of pixels each of whose absolute difference value is not smaller than a predetermined difference threshold value and, based on the count value, computes a motion metric indicating the likelihood that the attention pixel or its surrounding pixels are contained in a moving object. In the present embodiment, the larger the value of the motion metric, the higher the likelihood that the attention pixel or its surrounding pixels are contained in a moving object.

In the present embodiment, the filter region is a region having a size of 5 pixels vertically and 5 pixel horizontally and centered around the attention pixel. The size of the filter region is not limited to this particular example, but may be 3 pixels vertically and 3 pixel horizontally or 7 pixels vertically and 7 pixel horizontally. The difference threshold value is set, for example, to a value corresponding to the amount of interframe change of the pixel value of any pixel contained in a moving object, for example, to 30 when each pixel value is represented by a value in the range of 0 to 255.

For each attention pixel, the motion metric computing unit 12 compares the count value of the number of pixels located within the filter region and each of whose absolute difference value is not smaller than the difference threshold value, with a predetermined count threshold value M. The count threshold value M is set, for example, equal to about one third of the size of the filter region; in the present embodiment, the count threshold value M is set to 8.

When the count value is not smaller than the count threshold value M, the likelihood that the attention pixel or its surrounding pixels are contained in a moving object is high because the number of pixels having large absolute difference values is relatively large. Therefore, in this case, the motion metric computing unit 12 computes the motion metric value by taking a statistically representative value among the absolute difference value of the attention pixel and the absolute difference values of the pixels located within the filter region and each of whose absolute difference values is not smaller than the difference threshold value so that the motion metric value becomes large. To calculate the statistically representative value, the motion metric computing unit 12 need only calculate, for example, either an average or a median or a mode among the absolute difference value of the attention pixel and the absolute difference values of the pixels each of whose absolute difference value is not smaller than the difference threshold value. In the present embodiment, the motion metric computing unit 12 calculates the statistically representative value by taking an average among the absolute difference value of the attention pixel and the absolute difference values of the pixels each of whose absolute difference values is not smaller than the difference threshold value.

On the other hand, when the count value is smaller than count threshold value M, the likelihood that the attention pixel or its surrounding pixels are contained in a moving object is low because the number of pixels having large absolute difference values is relatively small. Therefore, in this case, the motion metric computing unit 12 computes the motion metric value by taking a statistically representative value among the absolute difference value of the attention pixel and the absolute difference values of the pixels located within the filter region and each of whose absolute difference values is smaller than the difference threshold value so that the motion metric value becomes small. In this case also, to calculate the statistically representative value, the motion metric computing unit 12 need only calculate, for example, either an average or a median or a mode among the absolute difference value of the attention pixel and the absolute difference values of the pixels each of whose absolute difference value is smaller than the difference threshold value. In the present embodiment, the motion metric computing unit 12 calculates the statistically representative value by taking an average among the absolute difference value of the attention pixel and the absolute difference values of the pixels each of whose absolute difference values is smaller than the difference threshold value. In this way, by computing the motion metric value using not only the absolute difference value of the attention pixel but also the absolute difference values of the pixels located around the attention pixel, the motion metric computing unit 12 can reduce the possibility of the motion metric value being affected by the pixel value fluctuation due to noise.

The motion metric computing unit 12 outputs the motion metric value on a pixel-by-pixel basis to the combining ratio computing unit 13.

The combining ratio computing unit 13 computes the combining ratio of the reference image to the current image on a pixel-by-pixel basis, computing the combining ratio so that the combining ratio of the reference image increases as the motion metric value for the pixel decreases, i.e., as the likelihood that the pixel is contained in a moving object decreases. In the present embodiment, the combining ratio is represented by a combining coefficient K by which to multiply the reference image and a combining coefficient (1−K) by which to multiply the current image. The combining ratio computing unit 13 computes the combining coefficient K by which to multiply the reference image on a pixel-by-pixel basis in accordance with the following equation.

$$K = \exp\left(-\frac{V^2}{2\sigma^2}\right) \times K0 \quad (1)$$

where K0 is the combining coefficient when the motion metric value is 0, i.e., the combining coefficient when the pixel is not contained in a moving object, and is set, for example, to about 0.5 to 0.7. Further, v represents the motion metric value. On the other hand, σ is a parameter for setting the combining coefficient K to K0 or lower in accordance with the motion metric value, and is set, for example, to about 5 to 10 in accordance with the noise characteristic or the ISO sensitivity of the camera module 2. For example, σ is set to a larger value as the amount of noise is larger or the ISO sensitivity is higher. Accordingly, the combining coefficient K takes a value that falls within the range of 0 to K0. The combining ratio computing unit 13 may compute the combining coefficient K, not by the above equation (1), but by some other suitable equation that sets the combining coefficient K smaller as the motion metric value becomes larger. The combining ratio computing unit 13 outputs the computed combining coefficients K and (1−K) on a pixel-by-pixel basis to the combining unit 14.

Figure 4:
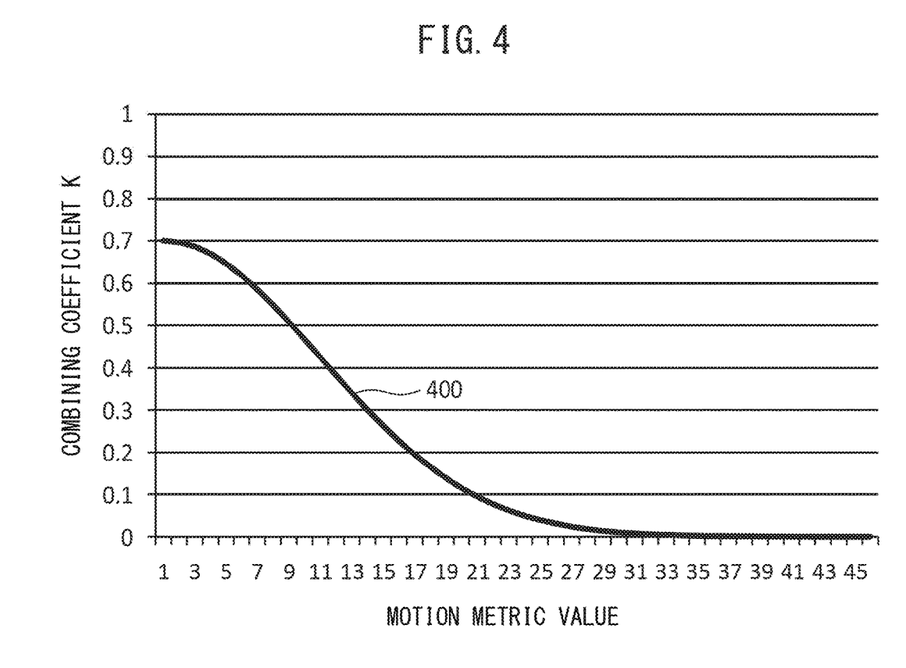
FIG. 4 is a diagram illustrating one example of the relationship between a motion metric and a combining coefficient K.

FIG. 4 is a diagram illustrating one example of the relationship between the motion metric and the combining coefficient K. In FIG. 4, the motion metric is plotted along the abscissa and the combining coefficient K along the ordinate. Graph 400 represents the relationship between the motion metric and the combining coefficient K as computed in accordance with the equation (1) when σ=10 and K0=0.7. As depicted by the graph 400, the combining coefficient K decreases as the value of the motion metric increases. In other words, the combining ratio of the reference image to the current image decreases for pixels having larger motion metric values.

The combining unit 14 produces the corrected image by combining each pixel value of the current image with each pixel value of the reference image on a pixel-by-pixel basis in accordance with the combining ratio computed by the combining ratio computing unit 13.

In the present embodiment, the combining unit 14 includes two multipliers 141 and 142 and one adder 143. The multiplier 141 multiplies the pixel value of the reference image by the combining coefficient K. On the other hand, the multiplier 142 multiplies the pixel value of the current image by the combining coefficient (1−K). Then, the adder 143 adds the output of the multiplier 141 to the output of the multiplier 142. As a result, the combining unit 14 calculates the pixel value of the corrected image on a pixel-by-pixel basis in accordance with the following equation.

$$O(n) = K \cdot O(n-1) + (1-K) \cdot I(n) \quad (2)$$

where I(n) represents the value of the attention pixel in the current image. Further, O(n−1) represents the value of the attention pixel in the reference image obtained from the immediately preceding image. On the other hand, O(n) represents the value of the attention pixel in the corrected image of the current image.

The combining unit 14 computes the corrected image by combining the current image and the reference image for all the pixels in accordance with the equation (2). Then, the combining unit 14 outputs the computed corrected image and writes the corrected image as the next reference image into the frame memory 15.

The frame memory 15 stores one or more reference images, and then outputs the stored reference image to the interframe difference computing unit 11, as well as to the combining unit 14.

Figure 5:
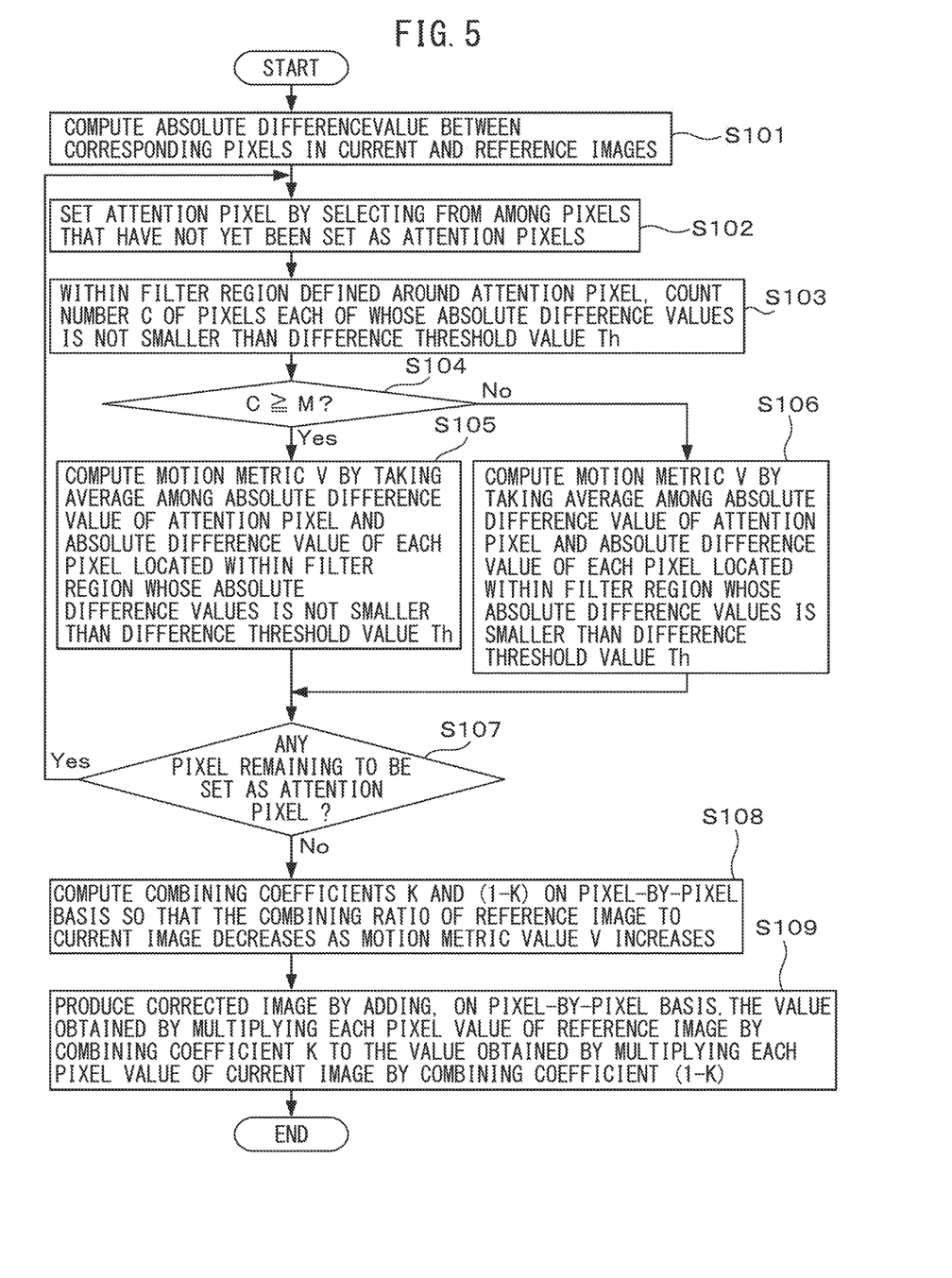
FIG. 5 is an operation flowchart of an image correction process according to a first embodiment.

FIG. 5 is an operation flowchart of an image correction process according to the present embodiment.

The interframe difference computing unit 11 computes the absolute difference value between corresponding pixels in the current and reference images on a pixel-by-pixel basis (step S101), and then outputs the pixel-by-pixel absolute difference value to the motion metric computing unit 12. The motion metric computing unit 12 sets an attention pixel by selecting from among pixels that have not yet been set as attention pixels (step S102). Then, within the filter region defined around the attention pixel, the motion metric computing unit 12 counts the number C of pixels each of whose absolute difference values is not smaller than the difference threshold value Th (step S103). The motion metric computing unit 12 then determines whether or not the count value C is equal to or larger than the count threshold value M (step S104). If the count value C is equal to or larger than the count threshold value M (Yes in step S104), the motion metric computing unit 12 computes the motion metric value V by taking an average among the absolute difference value of the attention pixel and the absolute difference value of each pixel located within the filter region whose absolute difference values is not smaller than the difference threshold value Th (step S105). On the other hand, if the count value C is smaller than the count threshold value M (No in step S104), the motion metric computing unit 12 computes the motion metric value V by taking an average among the absolute difference value of the attention pixel and the absolute difference value of each pixel located within the filter region whose absolute difference values is smaller than the difference threshold value Th (step S106).

After step S105 or S106, the motion metric computing unit 12 determines whether there is any pixel remaining to be set as an attention pixel (step S107). If there is any such pixel (Yes in step S107), the motion metric computing unit 12 repeats the process of steps S103 to S106. On the other hand, if no such pixel remains (No in step S107), the motion metric computing unit 12 outputs the motion metric value V for each pixel to the combining ratio computing unit 13.

The combining ratio computing unit 13 computes, on a pixel-by-pixel basis, the combining coefficient K for the reference image and the combining coefficient (1−K) for the current image so that the combining ratio of the reference image to the current image decreases as the motion metric value V for the pixel increases (step S108). The combining ratio computing unit 13 outputs the computed combining coefficients K and (1−K) to the combining unit 14.

The combining unit 14 produces the corrected image by adding, on a pixel-by-pixel basis, the value obtained by multiplying each pixel value of the reference image by the combining coefficient K to the value obtained by multiplying each pixel value of the current image by the combining coefficient (1−K) (step S109), and then outputs the produced corrected image and writes the corrected image as the next reference image into the frame memory 15. After that, the image correction apparatus 6 terminates the image correction process. The process of steps S108 and S109 may be performed after step S105 or S106 and before step S107.

As described above, the image correction apparatus adjusts the combining ratio of the reference image to the current image, based on the number of pixels located around the attention pixel and for which the change in pixel value along the time axis direction is large. Since the image correction apparatus can determine whether the attention pixel or its surrounding pixels are contained in a moving object more accurately than would be the case if it were determined using only the temporal change of the pixel value of the attention pixel, the combining ratio of the reference image can be reduced when the attention pixel or its surrounding pixels are contained in a moving object. As a result, the image correction apparatus can suppress the generation of the afterimage that could occur on the corrected image.

Next, an image correction apparatus according to a second embodiment will be described. The image correction apparatus according to the second embodiment differs from the image correction apparatus according to the first embodiment in the processing performed by the motion metric computing unit 12. The following therefore describes the motion metric computing unit 12. For the details of the other component elements, refer to the description of the corresponding component elements in the first embodiment.

In the present embodiment, as in the first embodiment, the motion metric computing unit 12 sets a filter region around an attention pixel selected on a pixel-by-pixel basis. However, in the present embodiment, for each pixel contained in the filter region, the motion metric computing unit 12 sets a weighting coefficient so that a heavier weight is applied as the absolute difference value between corresponding pixels in the current and reference images becomes larger. Then, for each pixel in the filter region, the motion metric computing unit 12 computes the motion metric value normalized by dividing the sum of the values obtained by multiplying the absolute difference value of each pixel by the weighting coefficient by the sum of the weighting coefficients, as indicated by the following equation $$V = \sum_{i,j=-2}^{2} (P(i,j) \times N(i,j)) \bigg/ \sum_{i,j=-2}^{2} (N(i,j)) \quad (3)$$

where P(i, j) (i=−2 to 2, j=−2 to 2) represents the absolute difference value of the pixel (i, j) contained in the filter region, and N(i, j) represents the weighting coefficient for the pixel (i, j). It is assumed that the pixel (0, 0) is set as the attention pixel.

Figure 6:
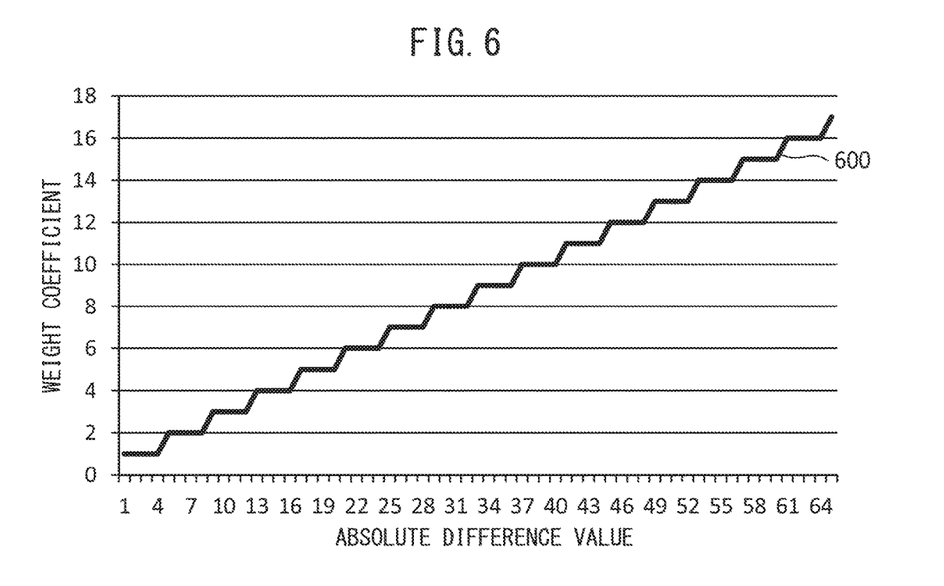
FIG. 6 is a diagram illustrating one example of the relationship between an absolute difference and a weighting coefficient.

FIG. 6 is a diagram illustrating one example of the relationship between the absolute difference value and the weighting coefficient. In FIG. 6, the absolute difference value is plotted along the abscissa and the weighting coefficient along the ordinate. In the illustrated example, graph 600 represents the relationship between the absolute difference value and the weighting coefficient when the weighting coefficient is determined by the equation N(i, j)=P(i, j)/4+1. The coefficient in the first term on the right-hand side of the equation may be set to 1 or 16 instead of (¼). This coefficient may be suitably determined, for example, by examining through experiment the effect of the noise elimination due to 3DNR and the condition in which an afterimage occurs. The second term on the right-hand side of the above equation is a constant term for preventing the weighting coefficient from becoming 0 when the absolute difference value is 0. As depicted by the graph 600, the weighting coefficient increases as the absolute difference value increases. The motion metric computing unit 12 may compute the weighting coefficient by some other suitable equation that sets the weighting coefficient larger as the absolute difference value becomes larger.

Figure 7:
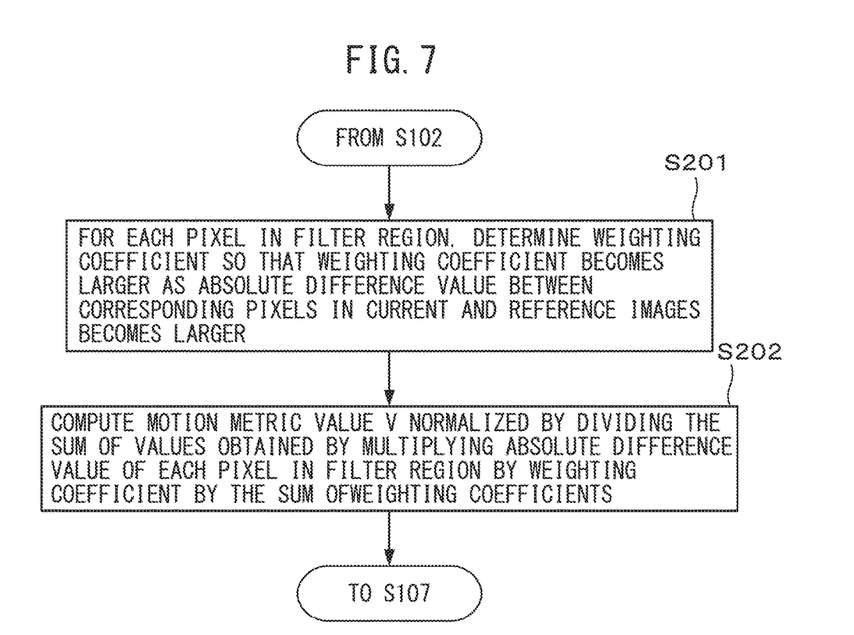
FIG. 7 is an operation flowchart of an image correction process according to a second embodiment.

FIG. 7 is an operation flowchart of an image correction process according to the second embodiment. The image correction process according to the second embodiment is the same as the image correction process according to the first embodiment, except the process concerning the motion metric computation (steps S103 to S106) in the flowchart depicted in FIG. 5. The following therefore describes the process concerning the motion metric computation.

When the attention pixel is set in step S102, the motion metric computing unit 12 determines the weighting coefficient for each pixel in the filter region so that the weighting coefficient becomes larger as the absolute difference value between corresponding pixels in the current and reference images becomes larger (step S201). Then, for each pixel in the filter region, the motion metric computing unit 12 computes the motion metric value V normalized by dividing the sum of the values obtained by multiplying the absolute difference value of each pixel by the weighting coefficient by the sum of the weighting coefficients (step S202).

According to the second embodiment, the image correction apparatus can make the motion metric value strongly correlated with the absolute difference value of each pixel located around the attention pixel. As a result, when the attention pixel or its surrounding pixels are not contained in a moving object, the weighting coefficient is approximately the same for all the pixels located within the filter region, and hence the motion metric value becomes close to the arithmetic average of the absolute difference values taken over the filter region. On the other hand, when the attention pixel or its surrounding pixels are contained in a moving object, the weighting coefficient becomes large for any pixel whose pixel value changes along the time axis due to the moving object. In this way, since the absolute difference value of any pixel whose pixel value changes along the time axis due to the moving object can be easily reflected in the motion metric value, the motion metric value becomes large for the pixel or its surrounding pixels contained in the moving object, and hence the combining ratio of the reference image to the current image decreases. As a result, the image correction apparatus can suppress the generation of the afterimage that could occur on the corrected image due to the moving object.

The present invention is not limited to the above particular embodiments. According to a modified example, the image correction apparatus may divide the current image into a plurality of blocks and may perform the processing of each of the above units after performing motion compensation on a block-by-block basis. In this case, the image correction apparatus performs block matching with the reference image on a block-by-block basis, and detects a reference region on the reference image that best matches the current block. Then, for each such block, the image correction apparatus performs motion compensation by moving the reference region so as to compensate for the amount of motion between that block and the reference region.

According to another modified example, the reference image may be a complete image generated one frame before the current image. Alternatively, the reference image may be an image generated one frame after the current image. As another alternative, the reference block need not be limited to an image that immediately precedes or succeeds the current image along the time axis direction. For example, assume that the current image is a top field containing only odd-numbered lines among the fields obtained by interlaced scanning. In this case, the reference image need not be limited to the bottom field generated immediately preceding or succeeding the current image, but a top field generated one frame before or after the current image may be used as the reference image.

According to still another modified example, the image correction apparatus may perform the image correction process according to any one of the above embodiments or their modified examples only for selected pixels in the current image. When the pixel value represents the luminance value, for example, the smaller the gain that is set for the camera module 2, and the larger the pixel value, the smaller the effects of noise components. In view of this, the image correction apparatus may be configured not to perform the image correction process, for example, for any pixel for which the gain is not larger than a predetermined value and for which the pixel value is not smaller than a predetermined threshold value. With this arrangement, the image correction apparatus can reduce the amount of computation required for the current image as a whole. The predetermined value for the gain is set, for example, to a value corresponding to the sensitivity ISO 100 to ISO 200, and the threshold value for the pixel value is set, for example, to 127 to 200 when the pixel value is represented by 8 bits.

According to yet another modified example, the image correction apparatus, in place of the control unit 7, may apply such processing as color balance adjustment, edge enhancement, or contrast enhancement to the corrected image.

The functions of the various units constituting the image correction apparatus according to any one of the above embodiments or their modified examples may be implemented by a computer program executed on a processor. Such a computer program may be provided in the form recorded on a computer readable recording medium such as a magnetic recording medium or an optical recording medium.

Figure 8:
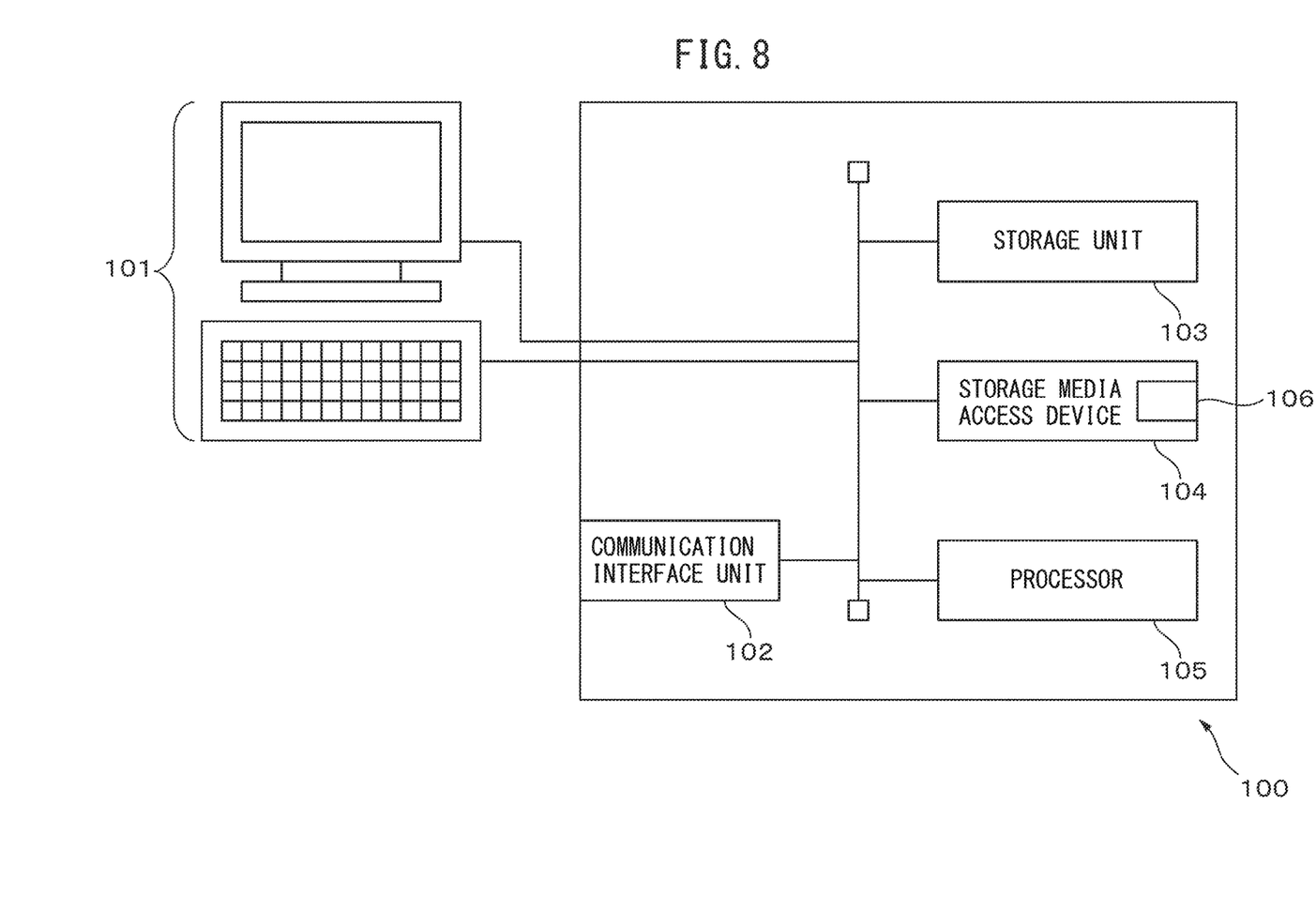
FIG. 8 is a diagram illustrating the configuration of a computer that operates as the image correction apparatus by executing a computer program for implementing the functions of the various units constituting the image correction apparatus according to any one of the above embodiments or their modified examples.

FIG. 8 is a diagram illustrating the configuration of a computer that operates as the image correction apparatus by executing a computer program for implementing the functions of the various units constituting the image correction apparatus according to any one of the above embodiments or their modified examples. The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and a mouse, and a display device such as a liquid crystal display. Alternatively, the user interface unit 101 may include a device, such as a touch panel display, into which an input device and a display device are integrated. The user interface unit 101 generates, for example, in response to a user operation, an operation signal for starting the image correction process, and supplies the operation signal to the processor 105.

The communication interface unit 102 may include a communication interface for connecting the computer 100 to an imaging apparatus (not depicted) capable of generating a plurality of temporally successive images, and a control circuit for the communication interface. Such a communication interface may be, for example, a Universal Serial Bus (USB) interface. Further, the communication interface unit 102 may include a communication interface for connecting to a communication network conforming to a communication standard such as the Ethernet (registered trademark), and a control circuit for the communication interface. In this case, the communication interface unit 102 acquires a plurality of temporally successive images from another apparatus connected to the communication network, and stores the plurality of images in the storage unit 103. The communication interface unit 102 may also receive a corrected image from the processor 105 and transmit it to another apparatus via the communication network.

The storage unit 103 includes, for example, a readable/writable semiconductor memory and a read-only semiconductor memory, and stores a computer program for implementing the image correction process to be executed on the processor 105, as well as storing the reference image or data such as intermediate computation results generated during the execution of the image correction process. The storage image also stores an image received via the communication interface unit 102, and corrected images generated by the processor 105, etc.

The storage media access device 104 is a device that accesses a storage medium 106 such as a magnetic disk, a semiconductor memory card, or an optical storage medium, and accesses the storage medium 106 to read out, for example, the computer program for image correction to be executed on the processor 105, and passes the readout computer program to the processor 105. Further, the storage media access device 104 may write the corrected image generated by the processor 105 onto the storage medium 106.

The processor 105 generates the corrected image by reducing the noise component contained in each pixel value of the target image by executing the computer program for implementing the functions of the various units constituting the image correction apparatus according to any one of the above embodiments or their modified examples, and stores the corrected image in the storage unit 104 or transmits it to another apparatus via the communication interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations can be made hereto without departing from the spirit and scope of the invention.

What is claimed is:

1. An image correction apparatus comprising:
a processor configured to:
compute an absolute difference value between corresponding pixels in a first and a second image;
determine, for each pixel contained in a filter region defined around an attention pixel on the first image, a weighting coefficient so that the weighting coefficient increases as the absolute difference value of the pixel increases;
compute a motion metric value indicating a likelihood of the presence of a moving object by summing values obtained by multiplying the absolute difference value of each pixel contained in the filter region by the weighting coefficient computed for the pixel;
compute a combining ratio of the second image to the first image so that the combining ratio decreases as the motion metric value becomes larger; and produce a corrected image by combining the value of the attention pixel in the first image with the value of the corresponding pixel in the second image in accordance with the combining ratio computed for the attention pixel and by taking the combined value as the value of the corresponding pixel in the corrected image.

2. The image correction apparatus according to claim 1, wherein computation of the motion metric value computes the motion metric value by taking the sum of the values each obtained by multiplying the absolute difference value of each pixel contained in the filter region by the weighting coefficient computed for the pixel and by dividing the sum by the sum of the weighting coefficients computed for the respective pixels in the filter region.

3. An imaging apparatus comprising:
a camera which generates a first and a second image; and
a processor configured to:
compute an absolute difference value between corresponding pixels in the first and second images,
determine, for each pixel contained in a filter region defined around an attention pixel on the first image, a weighting coefficient so that the weighting coefficient increases as the absolute difference value of the pixel increases;
compute a motion metric value indicating a likelihood of the presence of a moving object by summing values obtained by multiplying the absolute difference value of each pixel contained in the filter region by the weighting coefficient computed for the pixel;
compute a combining ratio of the second image to the first image so that the combining ratio decreases as the motion metric value becomes larger, and
produce a corrected image by combining the value of the attention pixel in the first image with the value of the corresponding pixel in the second image in accordance with the combining ratio computed for the attention pixel and by taking the combined value as the value of the corresponding pixel in the corrected image.

4. The imaging apparatus according to claim 3, wherein computation of the motion metric value computes the motion metric value by taking the sum of the values each obtained by multiplying the absolute difference value of each pixel contained in the filter region by the weighting coefficient computed for the pixel and by dividing the sum by the sum of the weighting coefficients computed for the respective pixels in the filter region.

\* \* \* \* \*